ROBERT J. DWYER,
INVENTOR.

BY

ATTORNEY

Patented Oct. 30, 1951

2,573,554

UNITED STATES PATENT OFFICE 2,573,554

LIGHT STABILIZER AND REGULATOR SYSTEM

Robert J. Dwyer, Pasadena, Calif., assignor, by mesne assignments, to Applied Research Laboratories, Glendale, Calif., a copartnership Application March 7, 1950, Serial No. 148,117

6 Claims. (Cl. 315—291)

This invention relates in general to electric regulation and more particularly to the automatic regulation of an electric light source.

The automatic regulation and stabilization of the light output from a light source to obtain a constant light output or to minimize fluctuations or variations in the output of a light source has been attempted by the employment of various control apparatus which includes electrical amplification means, the input of which is connected with suitable light measuring apparatus, such as a photoelectric cell or the like light sensitive device to receive the light from the source to be regulated, and the output of which is utilized to regulate the current input to the light source. All such systems employing amplifier means alone, are inherently unable to maintain perfect regulation of a light source for the obvious reason that the maintenance of any given corrective regulatory action is dependent upon the maintenance of a given, finite change in the light output of the source to be regulated. The ratio of the regulatory action tending to restore the light source to an equilibrium condition from a given departure from the output value to be maintained, to the change in the light source output necessary to effect such regulatory action, is the gain which ordinarily must be effected by the beforementioned amplifier system. Absolute regulation therefore cannot be attained by any such system alone, except in theory, by employing an amplifying system having a gain closely approaching infinity. Such a system is obviously impractical.

It is an object of this invention to provide improved means for automatically regulating or stabilizing the output of a light source.

It is a further object of this invention to provide automatic means for attaining substantially zero regulation of a light source with respect to its current supply or voltage.

It is a still further object of this invention to provide means for the automatic regulation of a light source which may be adjusted to have any desired regulation characteristics between predetermined positive and negative regulation limits.

Other objects, advantages and features of novelty will be evident hereinafter.

Figure 1A:
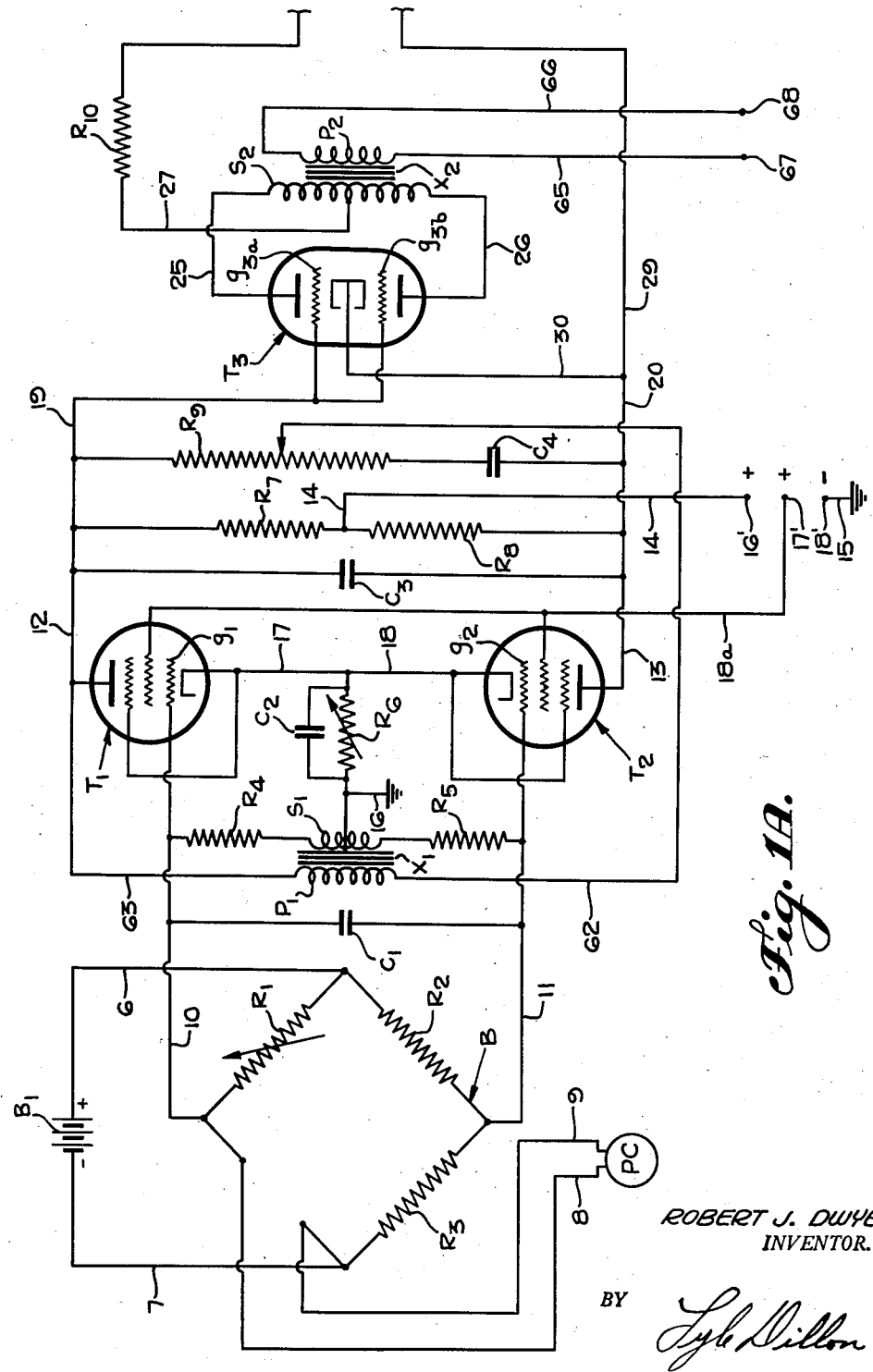
Figure 1B:
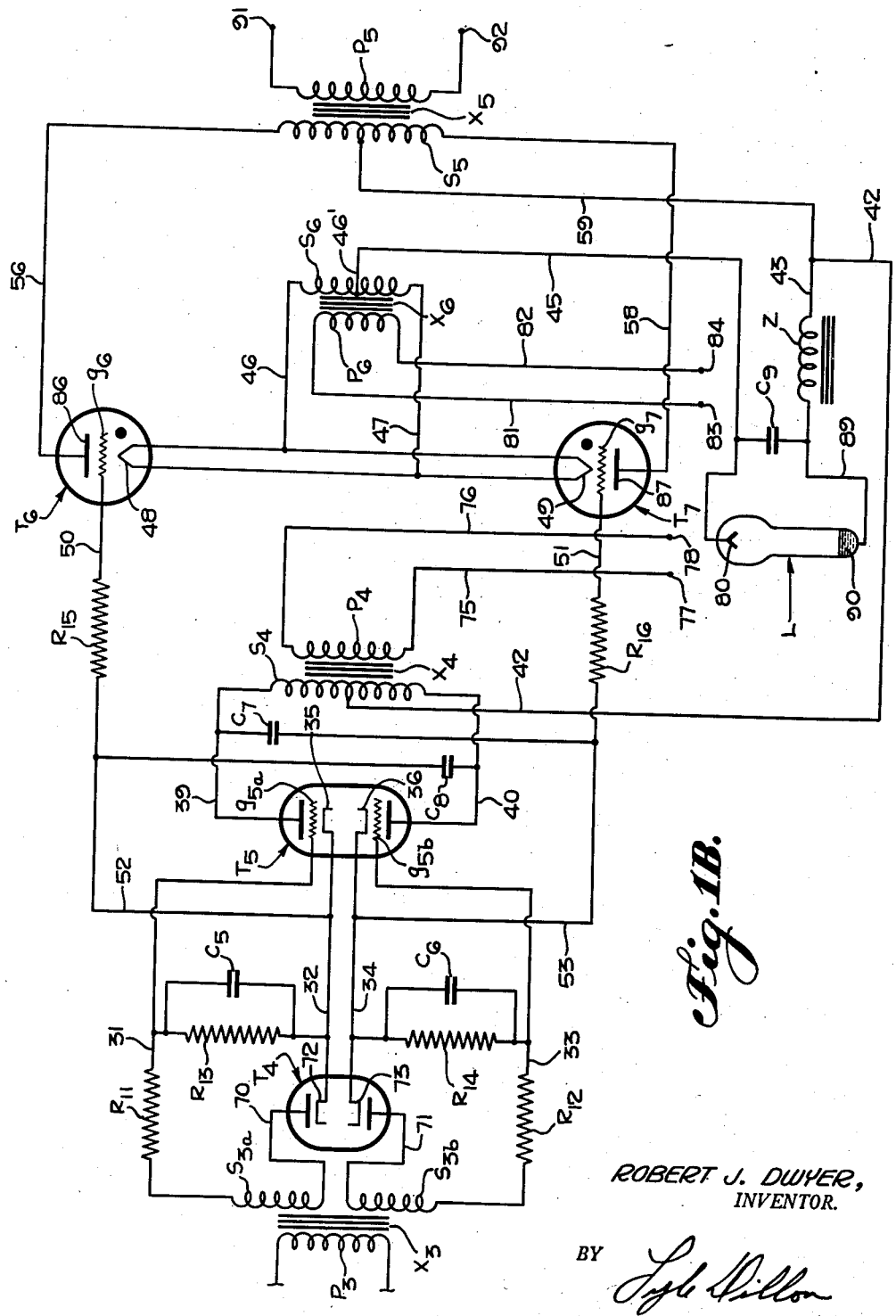

The drawing illustrates diagrammatically in Figures 1A and 1B, a preferred embodiment of the apparatus.

The apparatus is as follows:

The electric light device, the light output of which is to be regulated or stabilized is diagrammatically illustrated at L. In the present instance the device L is shown in a mercury arc lamp but this invention is not limited thereto but may also employ or be applicable to the employment of various types of gaseous discharge tubes and incandescent lights, the only limiting requirement in the type of lamp here employed being that it be capable of light output variations of fluctuations which closely correspond to the variations of fluctuations in the current supply thereto, all for reasons which will be more fully described hereinafter.

The actuating input to the control system is provided by means of a suitable photosensitive cell PC preferably, although not limited, to a photoconductive cell or the like light sensitive device. A photoconductive selenium cell manufactured by Evans Electroselenium Ltd. of Harlow, Essex, England, has been found suitable.

The photosensitive cell PC is located and maintained at a predetermined position, relative to the lamp L, so as to be illuminated thereby when the system is in operation. The photoconductive cell PC is connected through conductors 8 and 9 to, and forms in effect, one of the four resistance legs of a bridge circuit B. The other three legs of the bridge circuit B comprise resistances $R_1$, $R_2$ and $R_3$ which, with the photoelectric cell here chosen, may have resistances of approximately 20,000, 100,000 and 100,000 ohms, respectively. A bridge current supply battery $B_1$ is connected through conductors 6 and 7 across the input terminals of the aforesaid bridge circuit B. A six volt battery at $B_1$ is suitable.

The output terminals of the bridge circuit B are connected through conductors 10 and 11 to the grids $g_1$ and $g_2$ of electron tubes $T_1$ and $T_2$, respectively. The output of the bridge B may be shunted by means of a suitable condenser $C_1$ connected between the beforementioned bridge output conductors 10 and 11. This condenser may have a capacity of approximately .25 $\mu f$. An audio type transformer is provided at $X_1$, the secondary winding $S_1$ thereof being connected through resistors $R_4$ and $R_5$ to the beforementioned conductors 10 and 11, respectively, leading to the control grids $g_1$ and $g_2$ of electron tubes $T_1$ and $T_2$. The opposite ends of primary winding $P_1$ of the transformer $X_1$ are connected through conductors 62 and 63 with an intermediate portion of a variable resistor $R_9$, and the anode of tube $T_1$, respectively. The central point of the secondary $S_1$ of the transformer $X_1$ is connected to the common ground at 16 and the cathodes of the electron tubes $T_1$ and $T_2$ are connected together through conductors 17 and 18 and to a variable gain control resistor $R_6$ shunted by a condenser $C_2$ and thence to ground at 16. The gain control resistor $R_6$ may have a value of approximately 6,000 ohms and the condenser $C_2$ may have a value of approximately 50 $\mu f$. The resistor $R_9$ may have a value of approximately 100,000 ohms.

The electron tubes $T_1$ and $T_2$ are here, by way of illustration, shown as pentodes which are preferable, but other types such as tetrodes, for example, may be employed with such conventional modifications to the circuit as are required.

The anodes of the electron tubes $T_1$ and $T_2$ are connected through conductors 12 and 13, respectively, across a pair of series-connected output or anode resistors $R_7$ and $R_8$, the central point or junction of which is connected through conductor 14 to a positive terminal 16' for connection with the positive terminal of a suitable direct current supply, such as a battery, the negative terminal of which may be connected to terminal 18' which is, in turn, grounded at 15. The screen grids of the pentodes $T_1$ and $T_2$ are connected through conductor 18a to terminal 17' to which a suitable screen grid bias voltage supply may be connected. The output or anode resistors $R_7$ and $R_8$ may have values of approximately 450,000 and 300,000 ohms, respectively. A condenser $C_3$ of approximately .03 $\mu f$ is connected between conductors 12 and 13. The beforementioned resistor $R_9$ is connected in series with a condenser $C_4$ between conductors 12 and 13 leading from the anodes of tubes $T_1$ and $T_2$. Condenser $C_4$ may have a capacity of approximately 0.5 $\mu f$.

Conductor 12 leading from the anode of tube $T_1$ is connected through conductor 19 to the parallel connected control grids $g_{3a}$ and $g_{3b}$ of a twin triode electron tube $T_3$. Similarly, the conductor 13 leading from the anode of tube $T_2$ is connected through conductors 20 and 30 to the parallel connected cathodes of the same electron tube, $T_3$.

The anodes of the twin triode tube $T_3$ are respectively connected separately through conductors 25 and 26 with the opposite ends of the secondary $S_2$ of a power supply transformer $X_2$. The center point of the secondary $S_2$ is connected through conductor 27 and resistor $R_{10}$ to one end terminal of the primary windings $P_3$ of a transformer $X_3$. The opposite terminal of the primary $P_3$ of the transformer $X_3$ is connected through return conductor 29 and the beforementioned conductor 30 to the parallel cathodes of tube $T_3$.

The primary $P_2$ of the power transformer $X_2$ is connected through conductors 65 and 66 to terminals 67 and 68 to which a suitable source of alternating current may be applied.

The secondaries $S_{3a}$ and $S_{3b}$ are connected at their opposite ends respectively through resistances $R_{11}$ and $R_{12}$ and thence through conductors 31 and 33 to the separate control grids $g_{5a}$ and $g_{5b}$ of a twin triode electron tube $T_5$. The inner adjacent ends of the beforementioned secondaries $S_{3a}$ and $S_{3b}$ of the transformer $X_3$ are connected through conductors 70 and 71 to the separate anodes of a twin diode tube $T_4$. The separate cathodes 72 and 73 of tube $T_4$ are connected through conductors 32 and 34 with the separate cathodes 35 and 36 of tube $T_5$ so that cathodes 72 and 35 are isolated from cathodes 73 and 36. Parallel-connected resistor $R_{13}$ and condenser $C_5$ are connected between conductor 31 and 32 and similarly the parallel-connected resistor $R_{14}$ and condenser $C_6$ are connected between conductors 34 and 33. The resistors $R_{13}$ and $R_{14}$ may each have a value of approximately 75,000 ohms, condensers $C_5$ and $C_6$ may each have a capacity of approximately 0.5 $\mu f$, and resistors $R_{11}$ and $R_{12}$ may each have values of approximately 200 ohms.

A conductor 52 leads from conductor 32, at a point intermediate resistor $R_{13}$ and cathode 35, through resistor $R_{15}$ and conductor 50 to the control grid $g_6$ of a Thyratron $T_6$. Similarly, conductor 53 leads from conductor 34 through resistor $R_{16}$ and conductor 51 to the control grid $g_7$ of the Thyratron $T_7$. Resistors $R_{15}$ and $R_{16}$ may each have a value of approximately 60,000 ohms.

The anodes of tube $T_5$ are connected through conductors 39 and 40 to the opposite ends of the secondary $S_4$ of a power transformer $X_4$. The center point of secondary $S_4$ is connected through conductor 42 to the power supply circuits leading to the lamp L which will be more fully described hereinafter. Conductor 52 leading from the cathode 35 of tube $T_5$ is connected through a condenser $C_8$ to conductor 40, and similarly conductor 53 leading from cathode 36 is connected through condenser $C_7$ to conductor 39. Condensers $C_7$ and $C_8$ may have capacities of approximately .01 $\mu f$.

The primary $P_4$ of the power transformer $X_4$ is connected through conductors 75 and 76 to terminals 77 and 78 to which a suitable alternating current supply may be applied.

The cathodes 48 and 49 of the Thyratrons $T_6$ and $T_7$ are connected in parallel through conductors 46 and 47 to the secondary $S_6$ of a filament or cathode heater current supply transformer $X_6$. A center tap connection 46' is provided in the secondary $S_6$ from which a conductor 45 leads to the anode 80 of the lamp L. The primary $P_6$ of the cathode heater current supply transformer $X_6$ is connected through conductors 81 and 82 to terminals 83 and 84 for connection to a suitable alternating current supply.

The anodes 86 and 87 of the Thyratrons $T_6$ and $T_7$ are respectively connected through conductors 56 and 58 to opposite ends of the secondary $S_5$ of a power supply transformer $X_5$, and a center tap connection 59 leads from the center point of the secondary $S_5$ and through conductor 43, filter choke coil Z and conductor 89 to the cathode pool 90 of the lamp L. A filter condenser $C_9$ is connected across the lamp L between conductors 45 and 89. The filter choke Z may have an inductance of approximately 50 $\mu h$. and the filter condenser $C_9$ a capacity of approximately 300 $\mu f$.

The primary $P_5$ of the power supply transformer $X_5$ is provided with terminals 91 and 92 for connection to an alternating current power source. The input terminals to the power transformers $X_4$ and $X_5$ at terminals 77, 78 and 92, 91 are preferably connected to a common source of alternating current or at least to alternating current sources the frequencies of which are the same. The pairs of terminals 77, 78 and 91, 92 should be connected to the alternating current source in proper phase relationship with one another.

While the tubes $T_3$, $T_4$ and $T_5$ have been illustrated as twin types, two single tubes of comparable construction and characteristics may be substituted for each such twin tube. The following tubes have been found suitable for use in the illustrated system of the present invention: 6AU6 pentodes at $T_1$ and $T_2$; a 6SN7 twin triode at $T_3$; a 6AL5 twin diode at $T_4$; a 6SL7 twin triode at $T_5$ and C16S Thyratrons at $T_6$ and $T_7$.

The lamp L as illustrated herein is as beforedescribed, a mercury vapor arc lamp which operates at approximately 70 volts with a current of approximately 30 amperes.

Thermador 3L1103 audiotransformers may be employed at $X_1$, $X_2$ and $X_4$. Transformer $X_3$ is an audiotransformer type having a primary to secondary turns ratio of 1:15 for each section.

The operation of the application is as follows:

Assume the mercury arc lamp L to be in operation and the light therefrom impinging upon and producing a given illumination of the photocell PC. The photocell will, under such conditions assume an effective resistance which corresponds to the resulting illumination. The resistance $R_1$ in the bridge circuit is then adjusted to effect an approximate balance of the bridge circuit at the given or chosen illumination and resulting resistance of the cell PC. Under these conditions this approximate balance adjustment is preferably made such that a small potential difference, approximately 0.2 v., appears between the conductors 10 and 11 leading from the output of the bridge circuit to the voltage divider resistances $R_4$ and $R_5$ and to the respective grids $g_1$ and $g_2$, of the vacuum tubes $T_1$ and $T_2$, conductor 10 thus being 02 v. negative with respect to conductor 11. The grid $g_1$ of tube $T_1$ which has the higher load resistance $R_7$ is thereby biased slightly more negative than grid $g_2$ of tube $T_2$ which has the lower load resistance $R_8$. Under these conditions both tubes $T_1$ and $T_2$ are further biased, by adjustment of $R_6$, to operate within the nonlinear portions, but slightly below the regions of maximum nonlinearity, of their grid voltage-plate current characteristic curves, with tube $T_1$ being biased slightly more negative than tube $T_2$ as beforementioned. Tube $T_1$ will thereby be adjusted to operate in a more linear portion of the curve than tube $T_2$. Under the foregoing conditions the plate currents of the tubes $T_1$ and $T_2$ will flow through the conductors 12 and 13, through load resistors $R_7$ and $R_8$ and thence through conductor 14 to the positive terminal 16' of the anode voltage supply and return through the ground connections 15 and 16, gain resistor $R_6$ and connections 17 and 18 leading to the cathodes of tubes $T_1$ and $T_2$. The current flowing through the beforementioned resistors $R_7$ and $R_8$ results in the maintenance of a potential difference between the conductors 19 and 20 leading respectively to the grids $g_{3a}$ and $g_{3b}$ and the cathodes of the vacuum tube $T_3$, said voltage difference between conductors 19 and 20 being that determined by the magnitude of the anode currents flowing in tubes $T_1$ and $T_2$ and the values of the resistors $R_7$ and $R_8$, as hereinafter more fully described. The potentials of the grids $g_{3a}$ and $g_{3b}$ with respect to the cathodes are thus maintained such as to result in a certain degree of conductivity in the plate circuits of tube $T_3$. Half wave grid controlled rectification thus occurs in each of the plate circuits of tube $T_3$ resulting in a 60 cycle unidirectional pulsating current in conductors 25 and 26 which, in turn, results in a unidirectional 120 cycle pulsating current in conductor 27 leading from the center tap of the transformer secondary $S_2$ of transformer $X_2$. This 120 cycle unidirectional pulsating current flows from the center tap of the secondary $S_2$ of the transformer $X_2$ through conductor 27, resistor $R_{10}$, and primary windings $P_3$ of the transformer $X_3$ and return through conductors 29 and 30 to the cathodes of tube $T_3$.

The 120 cycle alternating current component of the current flowing through the primary $P_3$ induces a corresponding 120 cycle alternating potential in the secondary windings $S_{3a}$ and $S_{3b}$ of the transformer $X_3$ which results in a current flow through the plate circuits of the two rectifier sections of rectifier tube $T_4$, resulting in half wave rectification in each of said plate circuits of the 120 cycle alternating potential applied thereto. Said rectified potentials appear between the conductors 31 and 32 leading from the secondary $S_{3a}$ and cathode of the upper rectification section of tube $T_4$ and also across conductors 33 and 34 leading from the secondary $S_{3b}$ and the cathode of the lower rectification section of the tube $T_4$. These resulting pulsating potentials are filtered by the capacitors $C_5$ and $C_6$, respectively, and the thus filtered D. C. potentials applied between the grid $g_{5a}$ and its cathode 35 and between the grid $g_{5b}$ and its cathode 36, respectively, of the two sections of tube $T_5$.

The plate circuits of the two sections of tube $T_5$ are thus rendered conductive in accordance with a function of the D. C. potentials applied between the grids and the cathodes thereof as beforedescribed. This results in 60 cycle unidirectional pulsating plate current flow in each of the conductors 39 and 40 through their respective halves of the secondary winding $S_4$ of the transformer $X_4$ and out through the center tap connector conductor 42, through conductors 42 and 43, choke Z, lamp L and condenser $C_9$ in parallel, conductor 45, centered tap 46' of the filament transformer $X_6$ and through filament heater current supply conductors 46 and 47 to the cathodes 48 and 49 of the Thyratron rectifier tubes $T_6$ and $T_7$, respectively, and thence to the grids $g_6$ and $g_7$ and return through the opposite grid connection conductors 50 and 51, resistors $R_{15}$ and $R_{16}$ and conductors 52 and 53 to the cathodes 35 and 36, respectively, of tube $T_5$.

The grids $g_6$ and $g_7$ of the Thyraton tubes $T_6$ and $T_7$, respectively, are thus subjected to half cycle positive pulses with respect to their cathodes 48 and 49, such pulses being 180 degrees out of phase with respect to one another and in suitable phase relationship with each positive half cycle of the 60 cycle alternating potentials applied between the cathodes and plates of the Thyratrons $T_6$ and $T_7$. The Thyratrons $T_6$ and $T_7$ are thus fired alternately at some time during each positive half cycle of the applied potential. The time of firing and thus the portion of the half cycle during which each of the Thyratrons are conductive is a function of the amplitude and phase of the positive potential pulses thus applied to the grids $g_6$ and $g_7$.

Half wave rectification is thus effected in each of the Thyratrons $T_6$ and $T_7$ resulting in unidirectional pulsating current flow in their plate connection conductors 56 and 58 through the opposite halves of the secondary $S_5$ of the supply transformer $X_5$ and thence through the secondary center tap connection 59 through conductor 43, choke Z, lamp L and condenser $C_9$ in parallel, conductor 45, center tap 46 of filament supply transformer $X_6$ and thence through filament supply conductors 46 and 47 to the Thyratron cathodes 48 and 49. The current flow through the transformer center tap conductor 59 to the lamp L would be primarily a 120 cycle unidirectional pulsating current except for a partial smoothing action of the filter system comprising the choke Z and the condenser $C_9$. The current which passes through the lamp L is, therefore, a partially filtered pulsating D. C. carrying a substantial 120 cycle alternating current component together with other higher frequency, alternating current components caused by the abrupt switching or firing of the Thyratrons $T_6$ and $T_7$ at intermediate portions of the half cycles during which they may be conductive.

Assuming as aforesaid that the lamp L is lighted and the light therefrom is producing a given illumination of the photocell PC, then in operation, the various hereinbefore described components of the circuit must be operating such as to cause the Thyratrons $T_6$ and $T_7$ to fire during each half cycle during which they may be conductive, at such a time as to supply a resultant current to the lamp L which will produce the given assumed illumination.

Now, for illustration of the regulating action of the system, assume that the light output from the lamp L tends to increase above the normal level desired to be maintained, for some reason such as an increase in the voltage of the current supply to the primary P of the current supply transformer $X_5$. The illumination of the photocell PC will thereby be increased resulting in a corresponding decrease in its resistance resulting in a change in the balance of the bridge circuit B in such a manner as to cause a change in the current flow from the battery $B_1$ through conductor 10 through voltage divider resistance $R_4$, secondary $S_1$ of the transformer $X_1$, resistor $R_5$ and return through conductor 11. This change will thus be such as to cause conductor 11 to swing to a more positive polarity and conductor 10 to swing to a more negative polarity with respect to one another resulting, in turn, in the grid $g_2$ becoming less negative and grid $g_1$ more negative with respect to their respective cathodes. The anode current flow through the tube $T_1$ is thus decreased while the anode current flow through tube $T_2$ is increased. The resultant decrease in current flow through conductor 12 and through resistor $R_7$ and thence through center tap conductor 14 to the terminal 16 of the voltage supply and the simultaneous increase in the current flow through conductor 13 and through resistor $R_8$ will cause conductor 19 to become less negative with respect to conductor 20, thereby in turn resulting in the grids $g_{3a}$ and $g_{3b}$ in tube $T_3$ becoming less negative with respect to their cathodes.

This swing toward a less negative potential of the grids $g_{3a}$ and $g_{3b}$ results in an increase in the conductivity in the plate circuits of the tube $T_3$ resulting in an increase in the 120 cycle pulsating unidirectional current flowing through the primary $P_3$ of the transformer $X_3$. This in turn results in an increase in the 120 cycle alternating potential induced in the secondary $S_{3a}$ and $S_{3b}$ resulting in an increase in the filtered D. C. negative potential applied to the grids $g_{5a}$ and $g_{5b}$ of the tube $T_5$. This in turn causes reduced conductivity in the plate circuits of the tube $T_5$, in turn resulting in a reduction in the equilibrium D. C. potential on condensers $C_7$ and $C_8$, thereby increasing the negative D. C. component of the pulsating potential applied between the cathode 48 and grid $g_6$, and between cathode 49 and grid $g_7$ of the Thyratrons $T_6$ and $T_7$. This change in the potential applied to the grids of the Thyratrons $T_6$ and $T_7$ causes a retardation of the time of firing of the Thyratrons, in each cycle which in turn results in a reduction in the average rectified unidirectional pulsating current flowing through the conductors 59, 43, choke Z, lamp L and return through conductors 45, center tap 46' and conductors 46 and 47 to the Thyratron cathodes 48 and 49. This in turn results in a reduction of the light output of the lamp L thereby compensating at least in part for the previously occurring increase in the light output as hereinbefore assumed.

In the case of a reduction in the light output from the lamp L, below the normal level desired to be maintained, the illumination of the photocell PC will be thereby reduced resulting in a corresponding increase in the resistance of the photocell PC, thereby in turn throwing the bridge circuit out of balance in a direction opposite to that hereinbefore described and causing the current flow from the battery out through conductor 10, through resistance $R_4$ and $R_5$ and return through conductor 11 to decrease, thereby causing conductor 10 to swing to a less negative polarity with respect to conductor 11, resulting in turn in the grid $g_2$ becoming more negative and the grid $g_1$ becoming less negative with respect to their respective cathodes. As a result of this the converse of that hereinbefore described in connection with an increase in the light output of the lamp L occurs throughout the circuit resulting in a corresponding increase in the light output of the lamp L.

Thus, whenever the light output of the lamp L tends to increase, this has the effect by the action of the circuit, as controlled by the photocell of shortening the portion of the alternating current cycle during which the Thyratrons $T_6$ and $T_7$ are conductive and thus reduce the flow of rectified current through the lamp L, thereby tending to restore the light output downward to its former value prior to the said increase. Conversely, any tendency for the light output of L to decrease has the effect of lengthening the portion of the alternating current cycle during which the Thyratrons $T_6$ and $T_7$ are conductive and thus to increase the flow of rectified current through the lamp L tending to restore the light output upward to its former value prior to the decrease.

A regulating circuit employing a photocell and the usual amplifiers would ordinarily have a characteristic which is known in the art as "regulation," that is, as applied to the present problem, a characteristic whereby, for example, any reduction in the light output from the lamp due to some reason such as, for example, a drop in the lamp current supply voltage as supplied by transformer $X_5$, would result in a corrective action, the degree of such correction being, however, never entirely sufficient to restore the light output to exactly its former value. Such regulation may be visualized graphically as a curve plotted in terms of change of supply voltage versus light output. In the previous example the curve would ordinarily have a positive slope. If the system were capable of maintaining the light exactly at a given value, that is, whenever the light changes, restoring it to the exact value which it has previous to change, the characteristic regulation curve would have a zero slope. If the system were such as to cause an increase in light with reduction in supply voltage, for example, and vice versa, the characteristic regulation curve would have a negative slope. The attaining of even a zero slope regulation characteristic by means of amplification alone would require, theoretically, an infinite gain in the amplifier, which is a practical impossibility and even if it were approached would introduce such problems as undesirable drift characteristics which would render the circuit substantially inoperative.

In the present circuit hereinbefore described, a regulation characteristic which may be continuously varied in slope between positive and negative values including a zero slope, has been attained, under finite amplifier gain conditions, in a novel manner as will be hereinafter described.

Whenever as a result of a tendency for the light output from the lamp L to increase, the circuit has acted to reduce it by reducing the portion of the alternating current cycle during which the Thyratrons are conductive, as hereinbefore described, this reduction in the portion of the alternating current cycle during which the Thyratrons are conductive has the effect of increasing the amplitude and the number of the alternating current components present in the current flowing through the lamp circuit. This increase in the amplitude and number of the alternating current components has two simultaneous effects.

The first effect is that a greater alternating voltage component is developed across the filter system Z, C. This increase in alternating voltage component being applied, by way of conductor 42, secondary $S_4$ and thence through tube $T_5$ to conductors 52 and 53, between the Thyratron grids and cathodes operates to cause a further change in the operation time of the Thyratron so as to further decrease the effective current through the lamp L thereby in turn further decreasing the light output in the direction required to correct the previous tendency for the light to increase above the level to be maintained.

The second effect is that due to the fact that in spite of the filtering action of the choke Z, $C_9$, a substantial residual alternating current component is present in the current flowing through the lamp L resulting in a corresponding fluctuation of the light output from the lamp L. This fluctuation of the light output results in a corresponding fluctuation in the resistance of the photocell PC which in turn results in the introduction of an alternating current component or corresponding frequency in the potential appearing between the conductors 10 and 11 leading from the bridge circuit to the grids $g_1$ and $g_2$ of the tubes $T_1$ and $T_2$. As hereinbefore described, by adjustment of the gain control $R_6$, the bias potentials of the grids $g_1$ and $g_2$ of the tubes $T_1$ and $T_2$ may be simultaneously shifted to cause the tubes to operate on the nonlinear portions, and preferably slightly below the points of maximum nonlinearity, of the tube characteristic (plate current-grid voltage) curve, resulting in a detector or rectification effect of a portion of the beforementioned alternating potential component thus applied to the grids of tubes $T_1$ and $T_2$. As beforestated, the grid $g_1$ of tube $T_1$ is biased slightly more negative than the grid $g_2$ of tube $T_2$ such that the operation of tube $T_2$ is slightly more nonlinear than tube $T_1$. Therefore, when the alternating potential is applied from conductors 10 and 11 to the grids $g_1$ and $g_2$ of tubes $T_1$ and $T_2$, a detector or rectification action occurs in the tubes, that in tube $T_2$ having the least negative bias being slightly greater than that of Tube $T_1$ having the greater negative bias. Consequently, the plate current of tube $T_2$ through $R_8$ due to the aforesaid alternating potential applied to the grids $g_1$ and $g_2$ increases slightly more than that of tube $T_1$ flowing through $R_7$. Thus the increase in voltage drop across the resistor $R_8$ is greater than the increase in voltage drop across the resistor $R_7$. The conductor 12 is thereby imparted a reduction in its negative potential with respect to the conductor 13, resulting in the grids $g_{3a}$ and $g_{3b}$ becoming a corresponding amount less negative, thereby in turn resulting in an increase in the flow of current in the anode circuits of tube $T_3$. This, by reason of the hereinbefore described action throughout the circuit, results in an additional reduction in the portion of the half cycles during which each of the Thyratrons $T_6$ and $T_7$ are conductive causing a still further reduction in the current and in the corresponding light output from lamp L.

Thus, the rectification effect due to the appearance of an alternating current component upon the grids $g_1$ and $g_2$ of the tubes $T_1$ and $T_2$ as beforedescribed is such as to be additive to the regulation characteristics of the circuit due to the amplification therein, to further improve the regulation, i. e. to reduce the change in light output from the lamp L with respect to change of voltage output of the lamp current supply $X_5$. If desired, by suitable manipulation of the gain control $R_6$ and thereby simultaneously shifting the different biases of the tubes $T_1$ and $T_2$, the light output versus input supply voltage, regulation curve of the circuit may be made to have any desired slope between certain practical limits, from a given positive slope to a given negative slope, the best operating adjustment being that which results in substantially a zero slope.

In the absence of means to prevent it, the regulation between the light output of the lamp L and the photocell PC, by reason of the action of the circuit, may tend to hunt. Such hunting, however, is prevented in the following manner:

In event of a change in the light output of the lamp L, a corresponding change is reflected in the potential difference between conductors 19 and 20 leading to the grids and cathodes of the tube $T_3$. This change in potential difference results in a corresponding charging or discharging current for condenser $C_4$, flowing through resistor $R_9$ which in turn results in a potential change across the resistor $R_9$. Thus when the output voltages of tubes $T_1$ and $T_2$ change, as beforestated, resulting in a change in the potential difference between conductors 19 and 20, a current proportional to the rate of such change flows through resistor $R_7$, to charge or discharge condenser $C_4$. A portion of this current as determined by the setting of tap 61 upon resistor $R_9$, passes through conductor 62 and the primary $P_1$ of the transformer $X_1$ and return through conductor 63. This current through the primary $P_1$ of the transformer $X_1$ induces a voltage in the secondary $S_1$ of the transformer $X_1$ which is fed back and applied as a bucking voltage to the grids $g_1$ and $g_2$ of the tubes $T_1$ and $T_2$ in such a fashion as to oppose the beforementioned change. A force offering opposition to any tendency to oscillate or to hunt is thus introduced into the circuit.

It is to be understood that the foregoing is illustrative only of a preferred embodiment and that the invention is not to be limited thereby but may include various modifications within the skill of the art without distinguishing from the scope of the invention as defined in the appended claims.

What is claimed is:

1. In an automatic light regulating circuit, apparatus comprising: a direct current amplifier including a pair of electron discharge devices each having a cathode, control grid and anode, said devices being connected in push-pull; a signal input source connected between said control grids, said signal input source comprising a Wheatstone bridge circuit; a photoconductive device in one leg of said bridge circuit; conductors connecting the opposite output terminals of said bridge circuit respectively to the said control grids of said electron discharge devices; means for maintaining negative bias voltages upon said control grids sufficient to cause said devices to operate as so-called grid-bias detectors; means to maintain the negative bias on one of said devices greater than that of the other whereby the grid-bias detection action of one of said electron discharge devices is greater than that of the other; said photoconductive device and bridge circuit being arranged to apply increased negative potentials upon the said grid having the greatest negative bias, upon increase in conductivity of said photoconductive device; the greater output impedance load being connected to the anode of the device biased for the greater grid-bias detection action; a direct current voltage source the positive end of which is connected through said load impedances to the respective anodes of said electron discharge devices and the negative end of which is connected to the cathodes of said devices; a pair of output connections from said amplifier each connection extending from one of said anodes of said electron discharge devices; and a thyratron rectifier having a cathode, anode and control electrode; an alternating current supply means for the anode circuit of said thyratron; an electric light means connected in series in said circuit; means coupling said pair of output connections of said amplifier to said cathode and control electrode of said thyratron to control the duration of conductivity of said thyratron through said circuit for each cycle of the supplied alternating current such that an increase in fluctuation of the light from said electric light means falling upon said photoconductive device results in a decrease in the period of conductivity of said thyratron during each alternating current cycle.

2. In an automatic light regulating circuit, apparatus comprising: an electric light, said photocell device positioned to be illuminated by a light; a grid-bias detector; means connecting the output of said photocell device to the input of said grid bias detector; amplifier means adapted to produce an output of periodic unidirectional positive potential pulses of a predetermined fixed frequency in response to and of a potential bearing a predetermined direct functional relationship to a unidirectional potential input thereto; means connecting the output of said grid bias detector to the input of said amplifier means; a grid controlled rectifier; means connecting the output of said amplifier means to the control grid of said rectifier whereby said periodic positive pulses from said amplifier are applied to said control grid of said rectifier; means to supply an alternating potential of the same frequency as said positive potential pulses applied to said control grid of said rectifier; and conductor means for connecting said electric light, said rectifier and said supply means in series to supply said light with a current which is periodically valved and rectified by said rectifier to a pulsating unidirectional current.

3. In an automatic light regulating circuit, apparatus comprising: an electric light, said photocell device positioned to be illuminated by a light; a grid-bias detector; means connecting the output of said photocell device to the input of said grid bias detector; amplifier means adapted to produce an output of periodic unidirectional positive potential pulses of a predetermined fixed frequency in response to and of a potential bearing a predetermined direct functional relationship to a unidirectional potential input thereto; means connecting the output of said grid bias detector to the input of said amplifier means; a grid controlled rectifier; means connecting the output of said amplifier means to the control grid of said rectifier whereby said periodic positive pulses from said amplifier are applied to said control grid of said rectifier; means to supply an alternating potential of the same frequency as said positive potential pulses applied to said control grid of said rectifier; conductor means for connecting said electric light, said rectifier and said supply means in series to supply said light with a current which is periodically valved and rectified by said rectifier to a pulsating unidirectional current; and a filter system for partially removing the alternating current component of the said rectified pulsating unidirectional current flowing through said electric light.

4. In an automatic light regulating circuit, apparatus comprising: an electric light to be regulated; a photocell device positioned to be illuminated by said light; an amplifier including a first electron discharge device having a cathode anode and control electrode; conductors coupling the output of said photocell between the said control electrode and cathode of said first electron discharge device; means maintaining said electron discharge device biased to operate on a nonlinear portion of its characteristic so as to function at least in part as a so-called grid-bias detector; means to apply a positive D. C. potential to the anode with respect to the cathode of said first electron discharge device; a second electron discharge device having a cathode anode and control electrode; a conductor connecting the anode of said first electron discharge device to the control electrode of said second electron discharge device; means to supply an alternating potential between said anode and cathode of said second electron discharge device whereby a pulsating unidirectional current may flow in the anode cathode circuit thereof as controlled by said control electrode; a thyratron rectifier having a cathode anode and control electrode; means actuatable by such unidirectional pulsating current to apply to said control electrode of said rectifier a pulsating positive potential having a value bearing a predetermined functional relationship to and of the same frequency as said pulsating unidirectional current; conductor means connecting said thyratron cathode to anode and said electric light in series; means to supply an alternating potential across said series connected rectifier and electric light, whereby a current may flow through said light which is periodically valved and rectified by said rectifier to a pulsating unidirectional current the frequency of said alternating potential supply to said rectifier and the said resultant rectified pulsating unidirectional current being the same as that of said pulsating positive potential; and a filter system for partially removing the alternating current component of the said rectified pulsating unidirectional current flowing through said electric light.

5. In an automatic light regulating circuit, apparatus comprising: a direct current amplifier including a first pair of electron discharge devices each having a cathode, control grid and anode, said device being connected in push-pull; a signal input source connected between said control grids; means for maintaining negative bias voltages upon said control grids sufficient to cause said electron discharge devices to operate as so-called grid-bias detectors; means to maintain the negative bias on one of said devices greater than that of the other whereby the grid-bias detection action of one of said devices is greater than that of the other; unequal output load impedances connected to the anodes of said devices, the greater output impedance load being connected to the anode of the device biased for the greater grid-bias detection action; a D. C. voltage source the positive end of which is connected through said load impedances to the respective anodes of said devices and the negative end of which is connected to the cathodes of said devices; a pair of output connections from said amplifier each connection extending from one of said anodes of said devices; a second pair of electron discharge devices each having a cathode, control grid and anode; a conductor connecting the anode of the one of the first pair of electron discharge devices having the greater output impedance load to both of the said control grids of said second pair of electron discharge devices; a conductor connecting the anode of the other of the first pair of electron discharge devices having the smaller output impedance load to both of the said cathodes of said second pair of electron discharge devices; a pair of output connections each extending from one of said anodes of said second pair of electron discharge devices; a first transformer having primary and secondary windings; a connection from one end of the secondary of said transformer to one of said anodes of said second pair of electron discharge devices and a connection from the other end of the said secondary to the other of said anodes of said second pair of electron discharge devices; a center tap in said secondary windings; output connections from said center tap and from the cathodes of said second pair of electron discharge devices; means to connect a source of alternating current to the said primary winding of said transformer; a second transformer having primary and secondary windings; means connecting said output connections from said center tap and from the cathodes of said second pair of electron discharge devices respectively to opposite ends of said primary winding of said second transformer; a rectifier connected to said secondary of said second transformer, to rectify alternating current therefrom to produce a pulsating unidirectional potential; filter means to at least partially smooth said pulsating unidirectional potential; a third electron discharge device having a cathode, anode and control electrode; connections from the negative and positive terminals of said rectifier respectively to the control electrode and cathode of said third electron discharge device; a third transformer having primary and secondary windings; a connection from one end of said secondary winding of said third transformer to the said anode of said third discharge device; a thyratron rectifier; connections from the said cathode of said third electron discharge device to the control electrode of said thyratron rectifier; an alternating current supply means; an electric light means; connections connecting said supply means, said light means and said thyratron from anode to cathode in series; means connecting the other end of the said secondary of said third transformer with the cathode of said thyratron.

6. Apparatus according to claim 5 in which the signal input source comprises a photosensitive device.

ROBERT J. DWYER.

REFERENCES CITED

The following references are of record in the file of this patent:

UNITED STATES PATENTS

| Number | Name | Date |
|---|---|---|
| 1,810,172 | Hayes | June 16, 1931 |
| 2,443,347 | Field | June 15, 1948 |
| 2,450,479 | Lindsay | Oct. 5, 1948 |
| 2,487,010 | Wild | Nov. 1, 1949 |